United States Patent
Schwindt et al.

(10) Patent No.: US 8,412,416 B2
(45) Date of Patent: Apr. 2, 2013

(54) COLLISION WARNING DEVICE HAVING GUARDRAIL DETECTION

(75) Inventors: Oliver Schwindt, Farmington Hills, MI (US); Oliver Wackerl, Kirchcheim An der Teck (DE)

(73) Assignee: Robert Bosch GmbH, Stuttgart (DE)

( * ) Notice: Subject to any disclaimer, the term of this patent is extended or adjusted under 35 U.S.C. 154(b) by 553 days.

(21) Appl. No.: 12/451,023

(22) PCT Filed: Mar. 26, 2008

(86) PCT No.: PCT/EP2008/053537
§ 371 (c)(1),
(2), (4) Date: Mar. 18, 2010

(87) PCT Pub. No.: WO2008/145430
PCT Pub. Date: Dec. 4, 2008

(65) Prior Publication Data
US 2010/0286874 A1 Nov. 11, 2010

(30) Foreign Application Priority Data
May 25, 2007 (DE) .................. 10 2007 024 391

(51) Int. Cl.
*G08G 1/16* (2006.01)
(52) U.S. Cl. ................... 701/45; 340/435; 340/436
(58) Field of Classification Search .............. 701/45, 701/301, 300, 96, 469; 340/435, 436, 437, 340/439; 348/118, 119, 135, 143, 148, 152, 348/169, 171; 342/70; 382/103, 104, 106, 382/107, 291; 180/167, 169; 367/909
See application file for complete search history.

(56) References Cited

U.S. PATENT DOCUMENTS 5,680,117 A * 10/1997 Arai et al. ............... 340/903
6,470,272 B2 * 10/2002 Cong et al. ............... 701/301

FOREIGN PATENT DOCUMENTS

| DE | 10 2005 024 716 | 12/2006 |
|---|---|---|
| WO | WO 03/094130 | 11/2003 |
| WO | WO 2006/126736 | 11/2006 |
| WO | WO 2006/128766 | 12/2006 |

* cited by examiner

*Primary Examiner* — Thomas Black
*Assistant Examiner* — Marthe Marc-Coleman
(74) *Attorney, Agent, or Firm* — Kenyon & Kenyon LLP (57) ABSTRACT

A collision warning device for motor vehicles includes: a locating system for locating objects in the area in front of the vehicle; a control device for evaluating the data of the locating system and for outputting a warning signal in the event of an imminent risk of a collision; and a detection module for detecting the course of guardrails with the aid of the data of the locating system. In the control device an additional warning function is implemented, which calculates, with the aid of the dynamic state of the vehicle and with the aid of the detected guardrail course, a parameter for the transverse dynamics of the vehicle, which is required to avert a collision with the guardrail, and which outputs a warning signal when this parameter is larger than a predefined value.

5 Claims, 5 Drawing Sheets

COLLISION WARNING DEVICE HAVING GUARDRAIL DETECTION

BACKGROUND OF THE INVENTION

1. Field of the Invention

The present invention relates to a collision warning device for motor vehicles, having a locating system for locating objects in the area in front of the vehicle and a control device for evaluating the data of the locating system and for outputting a warning signal in the event of an imminent risk of a collision, and having a detection module for detecting the course of guardrails with the aid of data from the locating system.

2. Description of Related Art

Such collision warning devices are to help the driver guide the motor vehicle and help reduce the risk of an accident and/or help lessen the consequences of an accident, and are also known as PSS systems (predictive safety systems). The locating system is usually formed by a radar sensor allowing angular resolution, with which the distances, relative speeds, and azimuth angles of the located objects can be measured. With the aid of these data and with the aid of the dynamic data of the vehicle, the control device then calculates a so-called "time to collision," that is, the time after which the collision would occur if the dynamic state of the vehicle does not change. If this time lies below a specific threshold value, the warning signal is output, which may then be converted into an acoustic warning for the driver, for example, in order to alert the driver to the imminent risk. Furthermore, with the aid of the warning signal, some PSS systems are also able to trigger automatically suitable countermeasures, for example, an emergency braking, in order to avert the collision or at least to lessen its consequences.

Furthermore, so-called ACC systems (adaptive cruise control) are known, with which the vehicle's distance from a preceding vehicle located by the radar sensor may be regulated automatically. Within the framework of this regulation, only vehicle accelerations and decelerations that are within certain limits that are still perceived as comfortable for the vehicle occupants are permitted. When the traffic situation calls for a stronger vehicle deceleration, these systems also output a warning signal, which is to cause the driver to take control himself. In this respect, an ACC system may also be considered to be a collision warning device in the sense of the present invention.

While traditional PSS and ACC systems only react to moving objects, that is, in particular to preceding vehicles, efforts are made to include stationary objects in the evaluation as well, so that a collision warning may also be output when the host vehicle is approaching a stationary vehicle forming the end of a traffic jam, for example. However, the evaluation of stationary objects requires a significantly higher data processing effort, since the number of objects to be considered is then significantly greater and apart from this in many cases it is difficult to make a decision regarding whether a located object is a real obstacle or only an irrelevant object, such as a traffic sign on the side of the road or the like.

Published International PCT patent document WO 2006/128766 describes a collision warning device, which is able to use characteristic patterns to detect specific object classes in the data supplied by the locating system, even guardrails, among other things. The information about the guardrails may then be used to plausibilize the anticipated travel corridor of the host vehicle, so that a decision may be made more reliably regarding whether a located stationary object is a real obstacle on the road, or whether the object is located beyond the guardrail on the side of the road.

Furthermore, so-called lane-maintenance assistants or lane-departure warning systems are known, which use a video system to detect the course of the sides of the road and trigger a warning signal or an automatic steering intervention when the driver is about to leave the lane in which he is currently driving.

BRIEF SUMMARY OF THE INVENTION

An objective of the present invention is to create a collision warning device of the type mentioned at the outset, with which the risk of a collision may be reduced even further.

According to the present invention, this objective is achieved in that an additional warning function is implemented in the control device, which warning function calculates, with the aid of the dynamic state of the vehicle and with the aid of the detected guardrail course, a parameter for the transverse dynamics of the vehicle required to avert a collision with the guardrail, and which outputs a warning signal when this parameter is greater than a predefined value.

The device according to the present invention allows for the driver to be warned early when he has deviated from the course and is about to graze a guardrail on the side of the road, for example, as a result of momentary drowsiness. In this context, the warning signal may be output so early that the impact with the guardrail may still be averted by a steering intervention without the transverse dynamics of the vehicle, for example, the transverse acceleration, becoming so great, that it is perceived as uncomfortable by the passengers or indeed that the driving stability of the vehicle is impaired. In particular, in this way it is possible to avoid a situation in which the driver detects the imminent impact with the guardrail too late and then reacts too severely, and as a result of this overreaction loses control over the vehicle.

In contrast to the known lane-departure warning systems, the device according to the present invention is not dependent on a video system and an associated electronic image evaluation. The guardrails may be detected by a radar sensor, for example, using Doppler pulse radar or using an FMCW radar sensor, like the one present in traditional collision warning devices and ACC systems.

The additional warning function according to the present invention differs from the traditional collision warning function primarily in the following two ways:

The traditional warning function reacts to localized objects that are located by the radar sensor. For a radar target to be detected as an "object" in this sense, the reflected radar signal must have a certain minimum amplitude, so that it clearly stands out from the noise background. Indeed, specific reflection points on guardrails, such as guardrail posts, for example, may also satisfy this requirement; however, whether or not a specific part of the guardrail is detected as a potential obstacle is then more or less a function of coincidence. On the other hand, in the device according to the present invention, the course of the guardrail is detected with the aid of the detection module, so that the warning function is available even for guardrail sections whose radar echo is below the detection threshold for objects.

Furthermore, in the traditional warning function, the collision warning signal is triggered only when the "time to collision" falls below a relatively small threshold value of 1-2 s, for example. If the threshold value were greater, the warning function would cause a significant increase in the frequency of false alarms or faulty reactions, which for their part may present a source of danger or at least may be perceived as disturbing by the passengers and thus call into question the acceptance of the system. In contrast, in the additional warning function according to the present invention, the triggering of the warning signal is not a function of the "time to collision," but rather is a function of a parameter that is representative of the transverse dynamics of the vehicle, for example, of the transverse acceleration that would occur if the driver attempts to prevent the (grazing) impact with the guardrail through a correcting steering intervention. In the special case of an imminent collision with the guardrail, this allows for a fundamentally earlier output of the warning signal, without an increase in the frequency of false alarms.

When the warning signal generated in the event of an imminent collision with the guardrail is used for a warning to the driver, this warning may be distinguishable from the warnings output in the framework of the normal collision warning function. For example, in the event of an imminent grazing of the guardrail, a haptic signal (vibration of the steering wheel or the like) may be output, while in the event of an imminent impact with an obstacle on the roadway, an acoustic warning occurs.

DETAILED DESCRIPTION OF THE INVENTION

Figure 1:
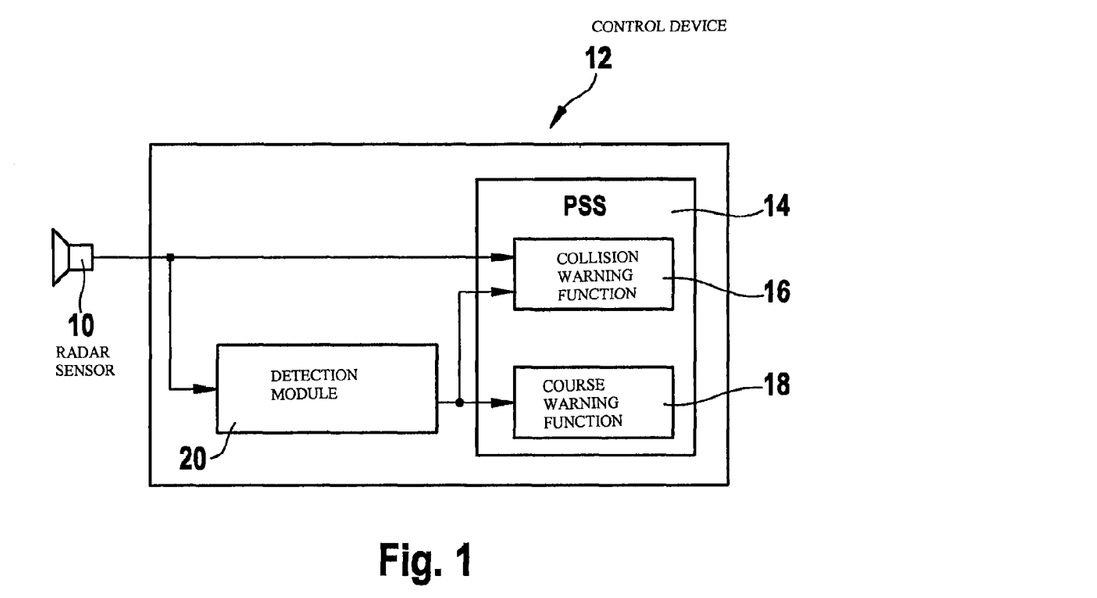
FIG. 1 shows a block diagram of a collision warning device according to the present invention.

The collision warning device shown in FIG. 1 includes a locating system, which in this instance is formed by a radar sensor 10, and an electronic control device 12, for example, a data processing system having corresponding software that evaluates the signals of radar sensor 10. At the core of control device 12 is a PSS module formed by a suitable hardware and/or software, in which two different warning functions are implemented, which in this instance are labeled as collision warning function 16 and course warning function 18. Collision warning function 16 corresponds to the traditional function of a known PSS system. As part of this function, a "time to collision" is calculated with the aid of location data of radar sensor 10 and with the aid of dynamic data of the vehicle outfitted with the collision warning device, and a warning signal is output when this "time to collision" falls below a specific threshold value.

Course warning function 18 is used in particular to warn the driver about an imminent (grazing) impact with a guardrail. To this end, control device 12 additionally includes a detection module 20, which with the aid of data of radar sensor 10, detects the course of guardrails present on the side of the road, for example.

A possible method for detecting the course of guardrails with the aid of data supplied by radar sensor 10 is explained with reference to FIGS. 2 through 4. In this context, it is assumed that radar sensor 10 is a long-range radar sensor (LRR) allowing angular resolution, namely a so-called FMCW radar (frequency modulated continuous wave), in particular.

In short, the functional principle of the FMCW radar is that a radar signal having a ramp-shaped modulated frequency is transmitted and the received radar echo is mixed with the transmitted signal, so that an intermediate frequency signal is received as a mixed product, whose frequency corresponds to the frequency difference between the transmitted signal and the received signal. This intermediate frequency signal is then broken down into its frequency spectrum, as shown in FIG. 2, for example.

Figure 2:
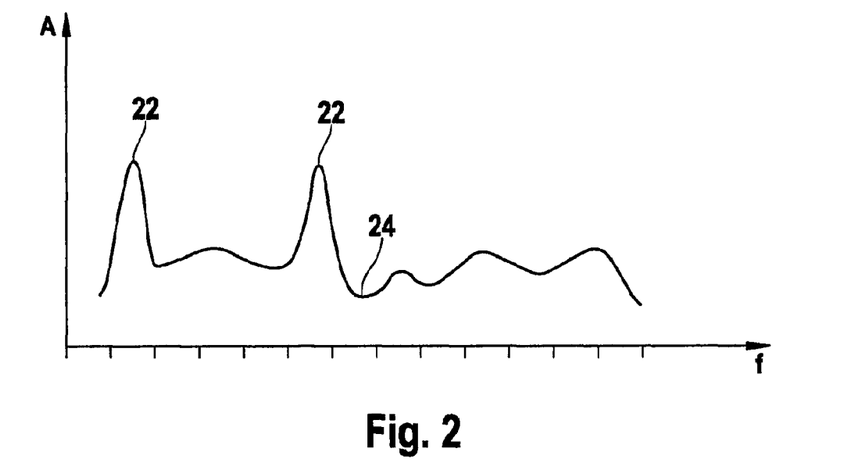
FIG. 2 shows a frequency/amplitude diagram for a signal received from a radar sensor.

In FIG. 2, amplitude A of the intermediate frequency signal is plotted against frequency f. Localized objects, such as preceding vehicles, signs on the side of the road, and the like stand out in the spectrum through individual peaks 22, which clearly stand out from noise background 24, and display their peak value respectively at a specific frequency. Due to the ramp-shaped modulation of the transmitted signal, the frequency of the peak is a function of the echo time of the relevant radar signal and thus of the distance of the object associated with the peak. However, due to the Doppler effect, the frequency of the peak is also a function of the relative speed of the object. Thus, the distance and the relative speed of the object still cannot be unambiguously determined with the aid of one individual peak 22.

To eliminate this ambiguity, the transmitted signal is usually modulated with two different ramps, for example, alternately with a rising and falling ramp. The part of the frequency originating from the Doppler effect is identical on both ramps, while the part that is a function of distance has an opposite sign on the two ramps. By once adding and once subtracting the frequency of the peaks, which are obtained for the same object on both ramps, the distance-dependent and speed-dependent parts may then be separated from each other.

Figure 3:
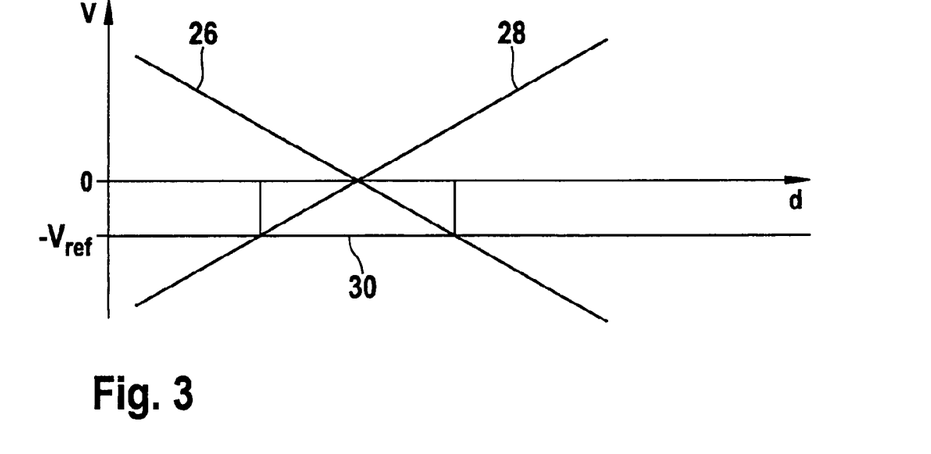
FIG. 3 shows a speed/distance diagram for explaining a method for evaluating the signals of the radar sensor.

In FIG. 3, for a specific frequency of an individual peak, the possible relative speed V of the relevant object is plotted against its distance d. For a rising ramp, the possible pairs of speed and distance lie on a falling straight line 26 (an increase in the distance d would lead to a smaller frequency of the received radar signal, and this would have to be compensated by the Doppler effect, i.e., the object would have to come closer or remove itself less quickly, that is, its relative speed V would have to decrease). Correspondingly, for a falling ramp, the pairs of speed and distance lie on a rising straight line 28.

In FIG. 3, straight line 30 represents stationary objects, i.e., objects whose relative speed has the value $-V_{ref}$, when $V_{ref}$ is the speed of the vehicle equipped with the collision warning device. If you assume that the object that generates the radar echo having the measured frequency is a stationary object, then consequently, a relevant distance value may be clearly assigned to each individual frequency (not only peaks 22) on each modulation ramp.

The angular resolution capacity of radar sensor 10 is achieved in that this sensor has a plurality of transmission and receiving elements that are laterally offset with respect to one another and whose intermediate frequency signals are evaluated independently from one another. Thus, for each individual element, a spectrum of the type shown in FIG. 2 is obtained on each ramp. For each frequency, the amplitudes in these different spectra have different values and the amplitude distribution is a function of the azimuth angle of the object. Thus, the azimuth angle at which the relevant signal was received may be determined from the amplitude distribution.

This is valid not only for the objects that are made apparent by peaks 22, but in principle for each frequency in the spectra.

FIG. 2 shows only the absolute value of amplitude A. However, in practice, these are complex amplitudes that differ not only in their value, but rather also in their phase, as a function of the azimuth angle. Through the evaluation of the amplitude relationships and phase relationships, it is possible to achieve a relatively high angular resolution capacity using relatively few transmission and receiving elements.

The detection of the course of the guard rails in detection module 20 is based on a statistical analysis of the locations (distances and azimuth angles) that may be assigned to the received radar echoes under the simplifying assumption that all echoes come from stationary objects. This assumption makes it possible to assign clearly a distance d (as shown in FIG. 3) and an azimuth angle to each frequency on each individual frequency modulation ramp. These pairs of variables may then be converted into Cartesian coordinates and entered into a digital map, as shown schematically in FIG. 4.

Figure 4:
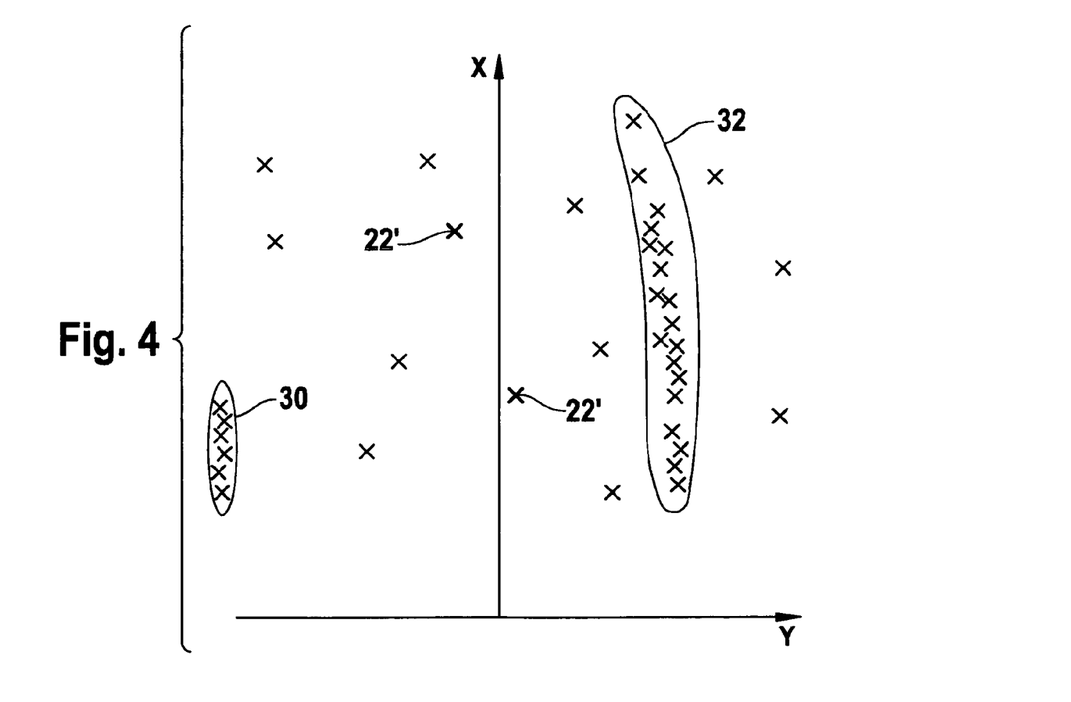
FIG. 4 shows a diagram for illustrating a method for determining the course of guardrails.

In the coordinate system shown in FIG. 4, the X axis corresponds to the longitudinal direction of the vehicle and the Y axis corresponds to the transverse direction. Each point marked by an "x" represents the location that was ascertained for a specific frequency. Since the determination of the distances and azimuth angle was carried out not only for peaks 22 in FIG. 2, but rather for a multitude of different frequencies, FIG. 4 offers a relatively large number of points that allow a statistical analysis.

Of course, the assumption that all of these points represent stationary radar targets is not the case in reality. For moving objects, for example, two preceding vehicles, that have caused the two peaks 22 in FIG. 2, this assumption is unacceptable, and the two corresponding points 22' drawn in bold in FIG. 4 consequently do not indicate the true locations of the relevant objects. In particular, distances d and thus the X coordinates of these objects will be erroneous. However, all remaining points in FIG. 4 come from fixed points of reflection and thus indicate the true position of these points of reflection. Since the portion of moving objects among the relatively large total number of measuring points in FIG. 4 is negligibly small, the error for the moving objects is unimportant for the statistical evaluation.

The advantage of this method is that it is possible to obtain measuring points even for relatively "flat" zones in the spectrum according to FIG. 2, where no pronounced peaks exist and where it therefore would not be possible to determine exactly the distance and the relative speed, because this would require identifying the peaks obtained on different ramps and assigning them to each other. In this manner, relatively weak and diffuse radar echoes may also be recorded, like those caused by guardrails, in particular. These guardrails become apparent as zones 30, 32 in FIG. 4, in which the measuring points (x) do not scatter statistically, but rather have a significant aggregation. Identifying zones 30, 32 in the digital map according to FIG. 4 makes it possible to ascertain the course of the guardrails, namely with a comparatively low data processing effort and with a high rate of repetition, to with, within each ramp of the measuring cycle of the radar sensor.

Figure 5:
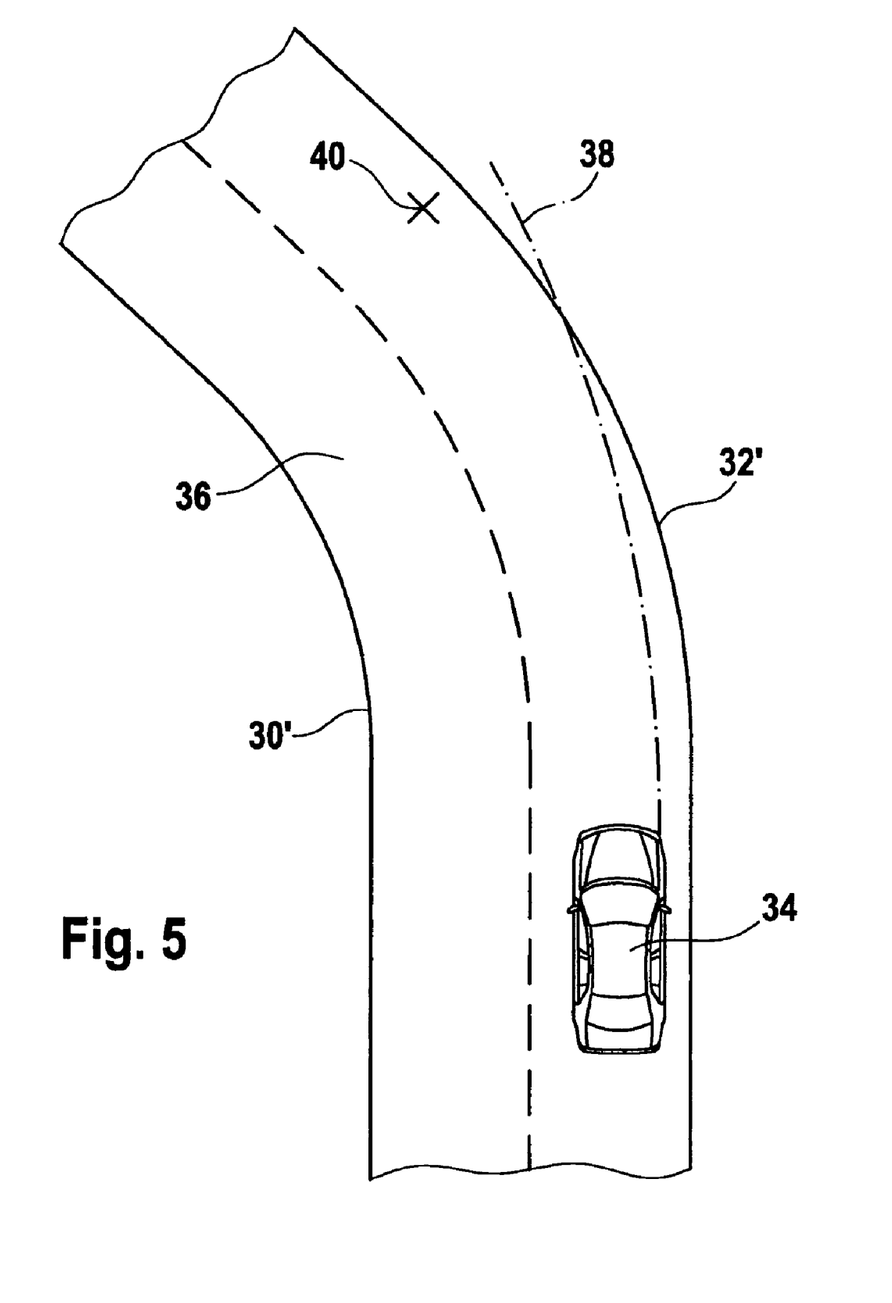
FIG. 5 shows a sketch of a traffic situation to explain the manner of functioning of the collision warning device according to the present invention.

Using an example, FIG. 5 now illustrates how the course of the guardrails detected by detection module 20 is used for course warning function 18.

In FIG. 5, vehicle 34 equipped with the collision warning device according to FIG. 1 drives on a road 36, which is delimited on the left and right by guardrails 30' and 32'. Vehicle 34 is just about to enter a curve and is entering this curve at an excessive speed, so that there is the danger that it will graze guardrail 32'. The course of guardrails 30', 32' is detected by detection module 20 in the manner described above. Course warning function 18 is implemented in control device 12 by software that checks to see whether there is a danger of colliding with one of these guardrails.

In this context, the precondition is assumed that the transverse dynamics of vehicle 34, which may be expressed as transverse acceleration, for example, must be restricted such that they are not perceived to be uncomfortable by passengers and that in any case the driving stability of vehicle 34 is guaranteed. With the aid of the vehicle's own speed $V_{ref}$, which is measured with the aid of a speed sensor of vehicle 34, a calculation is then made regarding the smallest radius of curvature of a vehicle course 38 for which this condition is still satisfied, i.e., for which the transverse acceleration occurring when following this course remains under the specified limiting value. A course in the form of a circular arc is assumed as driving course 38, whose center of curvature is at the same height as the front of vehicle 34 (on the Y axis). The radius of this driving course 38 corresponds to the calculated radius of curvature plus half of the vehicle width, so that in the event of a curve to the left, as in FIG. 5, driving course 38 describes the trajectory of the right, front corner of the vehicle.

Driving course 38 is then compared to the course of guardrail 32', and a check is carried out to see whether driving course 38 intersects guardrail 32'. If this is the case (as in FIG. 5), a warning signal is output.

This check may performed in an analogous manner for left guardrail 30', as well.

Figure 6:
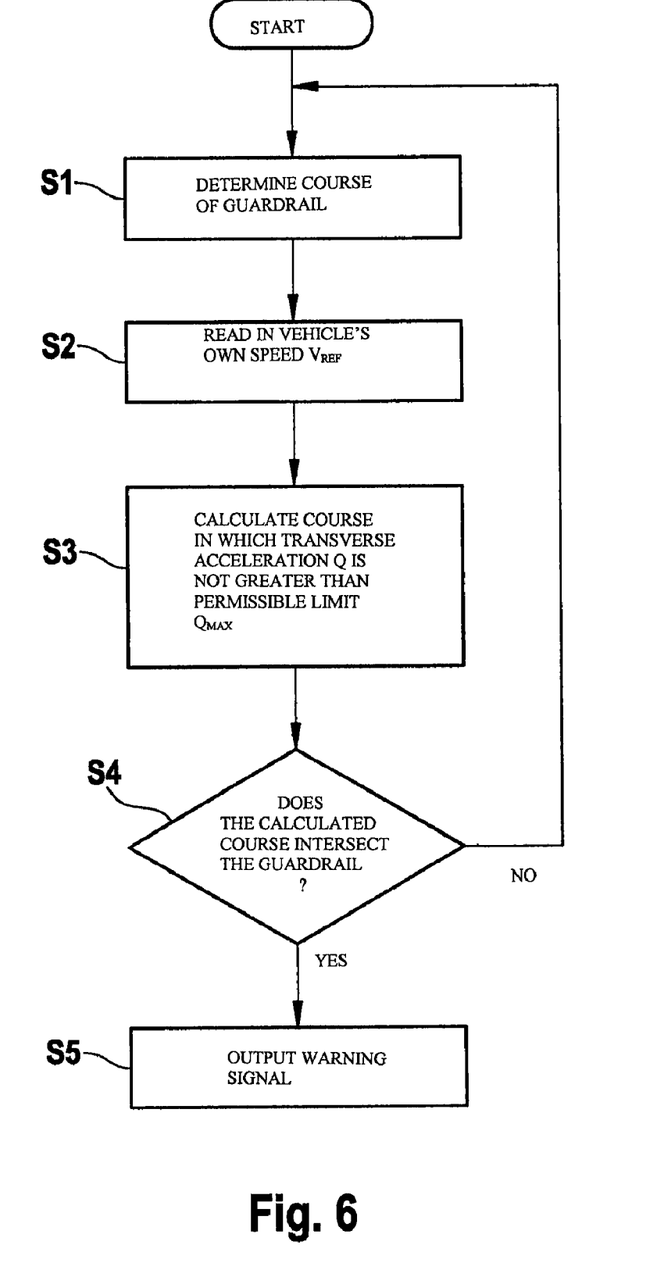
FIG. 6 shows a flow chart for illustrating the method of operation of the collision warning device.

In FIG. 6, the essential steps of the method are shown once again in a flow chart. The procedure shown in this flow chart is periodically executed by the computer of control device 12. The course of the guardrails is determined in step S1 (in detection module 20). The vehicle's 34 own speed $V_{ref}$ is read in step S2. In step S3, course 38 is calculated, that is, the course in which the transverse acceleration Q that is a function of the vehicle's own speed is not greater than a permissible limiting value $Q_{max}$. In step S4, a check is the carried out to see whether course 38 calculated in this manner intersects the guardrail. If this is the case, in step S5, a warning signal is output; otherwise, a return to step S1 occurs.

Provided a right and a left guardrail are detected by detection module 20, as in FIG. 5, in step S3, two courses are calculated, one with a right curvature and one with a left curvature, and these courses are compared in step S4 to the respective guardrails. Thus, course warning function 18 is not only available in front of or in curves, but rather also on straight route sections, so that the driver may also be warned when he departs from the roadway as a consequence of carelessness or due to momentary drowsiness. Naturally, this function is useful for heavy vehicles, in particular, for example, trucks, in which the danger is particularly high that the guardrail will be broken through and the vehicle will end up in the opposite lane.

As an alternative to the example described here, course warning function 18 may also be implemented in another manner. For example, with the aid of the course of the guardrails, it is possible to determine the point at which the straight-ahead direction of vehicle 34 intersects the guardrail, and then it is possible to determine the distance to this point and the angle that the guardrail forms at this point of the straight-ahead direction. From these variables and the vehicle's own speed $V_{ref}$ it is then possible to calculate a parameter that specifies the transverse dynamics that are necessary for an evasion maneuver, and the warning signal is triggered only when this parameter exceeds a corresponding threshold value.

The course of the guardrails detected with the aid of detection module 20 may also be used additionally in collision warning function 16 to plausibilize the course of the host vehicle and to decide whether a located (stationary) object is located on the roadway and thus presents a real obstacle, or is located beyond the guardrail and thus is outside of the roadway. As an example, in FIG. 7, a stationary object 40 is illustrated, which is located by radar sensor 10, and regarding which a decision must be made as to whether it presents a real obstacle on the roadway. To this end, as part of collision warning function 16, a check is carried out to see on which side of guardrail 32' object 40 is located. When it is located on the side of the guardrail facing the roadway, as is the case in FIG. 7, it is to be qualified as a real obstacle, and then when a suitable threshold value for the "time to collision" is undershot, a warning signal is output.

Figure 7:
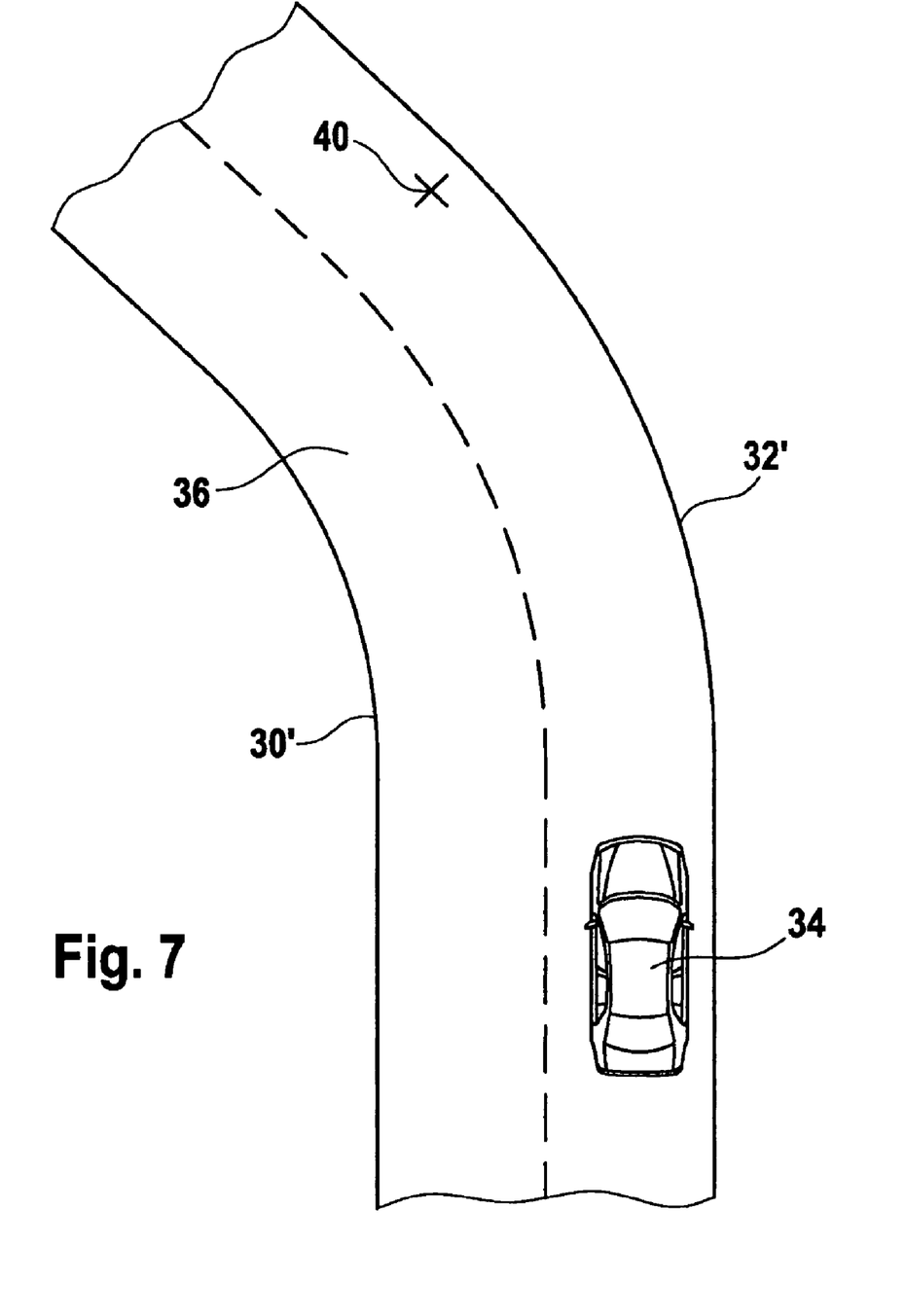
FIG. 7 shows an additional sketch of a traffic situation.

In this context, a relatively great threshold value may be selected, so that the warning takes place already at a relatively early point in time.

What is claimed is:

1. A collision warning device for a motor vehicle, comprising:
   an object locating system configured to supply data regarding detected object; and
   a control device operationally connected to the object locating system and receiving the data from the object locating system regarding detected object, the control device having a detection module configured to detect the course of guardrails in the path of the motor vehicle with the aid of the received data from the object locating system;
   wherein the data from the object locating system are evaluated in the control device to determine whether an imminent risk of collision for the motor vehicle exists, and in the case of the imminent risk of collision exists, a first warning function is implement by outputting a first warning signal, and wherein the control device performs an additional warning function by calculating, with the aid of dynamic state characteristics of the vehicle and with the aid of the detected guardrail course, a parameter for the transverse dynamics of the vehicle required to avert a collision with the guardrails in the path of the motor vehicle, and outputting a second warning signal when the parameter for the transverse dynamics is greater than a predefined threshold value.

2. The collision warning device according to claim 1, wherein the object locating system is configured to locate objects in the area in front of the vehicle.

3. The collision warning device as recited in claim 1, wherein the parameter for the transverse dynamics of the vehicle is a smallest-possible transverse acceleration value of the vehicle allowing the vehicle to pass the guardrails along the detected guardrail course without collision.

4. The collision warning device as recited in claim 3, wherein the control device is configured to calculate, for implementing the additional warning function, a reference course of the vehicle in which the transverse acceleration would be equal to the predefined threshold value at an instantaneous speed of the vehicle, and determine whether the determined reference course intersects with the guardrails along the detected guardrail course.

5. The collision warning device as recited in claim 4, wherein the object locating system is a radar sensor.

* * * * *

UNITED STATES PATENT AND TRADEMARK OFFICE
CERTIFICATE OF CORRECTION

PATENT NO.        : 8,412,416 B2  
APPLICATION NO.   : 12/451023  
DATED             : April 2, 2013  
INVENTOR(S)       : Schwindt et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 666 days.

Signed and Sealed this

First Day of September, 2015

Michelle K. Lee
*Director of the United States Patent and Trademark Office*